(12) United States Patent
Bishop

(10) Patent No.: US 7,946,113 B1
(45) Date of Patent: May 24, 2011

(54) OCEAN WAVE ELECTRICITY GENERATOR APPARATUS

(76) Inventor: Wayne Leonard Bishop, West Valley City, UT (US)

( * ) Notice: Subject to any disclaimer, the term of this patent is extended or adjusted under 35 U.S.C. 154(b) by 759 days.

(21) Appl. No.: 11/999,058

(22) Filed: Dec. 3, 2007

Related U.S. Application Data

(60) Provisional application No. 60/876,921, filed on Dec. 22, 2006.

(51) Int. Cl.
*F16D 31/02* (2006.01)
(52) U.S. Cl. ............... 60/398; 60/497; 60/507; 290/42; 290/53
(58) Field of Classification Search ............ 60/398, 60/195–197, 507; 290/42, 53
See application file for complete search history.

(56) References Cited

U.S. PATENT DOCUMENTS

| | | |
|---|---|---|
| 1,170,938 A | 2/1916 | Schaser |
| 1,318,469 A | 10/1919 | Wilkinson |
| 1,701,146 A | 2/1929 | Darwin |
| 3,297,300 A | 1/1967 | Mountanos |
| 3,808,445 A | 4/1974 | Bailey |
| 3,930,168 A * | 12/1975 | Tornabene ............... 290/53 |
| 3,952,517 A * | 4/1976 | Decker ............... 60/502 |
| 3,961,480 A * | 6/1976 | West ............... 60/496 |
| 3,965,365 A * | 6/1976 | Parr ............... 290/53 |
| 4,228,360 A | 10/1980 | Navarro |
| 4,249,639 A | 2/1981 | Vukovic |
| 4,284,902 A * | 8/1981 | Borgren et al. ............... 290/53 |
| 4,285,196 A | 8/1981 | Ekstrom et al. |
| 4,418,286 A | 11/1983 | Scott |
| 4,672,222 A | 6/1987 | Ames |
| 5,359,229 A | 10/1994 | Youngblood |
| 6,269,636 B1 | 8/2001 | Hatzilakos |
| 6,392,314 B1 | 5/2002 | Dick |
| 6,711,897 B2 | 3/2004 | Lee |
| 7,134,283 B2 | 11/2006 | Villalobos |

OTHER PUBLICATIONS

Dan Drulette, *Electricity From Wave Power*, Fortune Magazine, Dec. 2006/Jan. 2007.
Hans Bernhoff and Mats Leijon. *Conversion of Wave Energy to Electricity*. Dept. of Engineering, Uppsola University.
Ann Thompson, *Riding a Wave to Energy Independence*, NBC Nightly News Archive, Tuesday, Nov. 6, 2007.

* cited by examiner

*Primary Examiner* — Hoang M Nguyen

(57) ABSTRACT

An electricity generating or other power distributing device that utilizes the energy stored in ocean waves as they approach the shoreline. A series of buoys, which are thus struck by said waves are thrust upward and outward, operating hydraulic pumps. Fluid is pumped into a rotator that lifts a plurality of weights contained in deep silos within the earth. The cable devices connected to these weights are threaded around, and thus rotate a series of clutches, transmissions and flywheels, which provide a constant rotational output. This output can be attached to an A/C generator, or any other device requiring a constant force and rotation to operate properly.

6 Claims, 12 Drawing Sheets

OCEAN WAVE ELECTRICITY GENERATOR APPARATUS

CROSS REFERENCE TO RELATED APPLICATIONS

Figure 1:
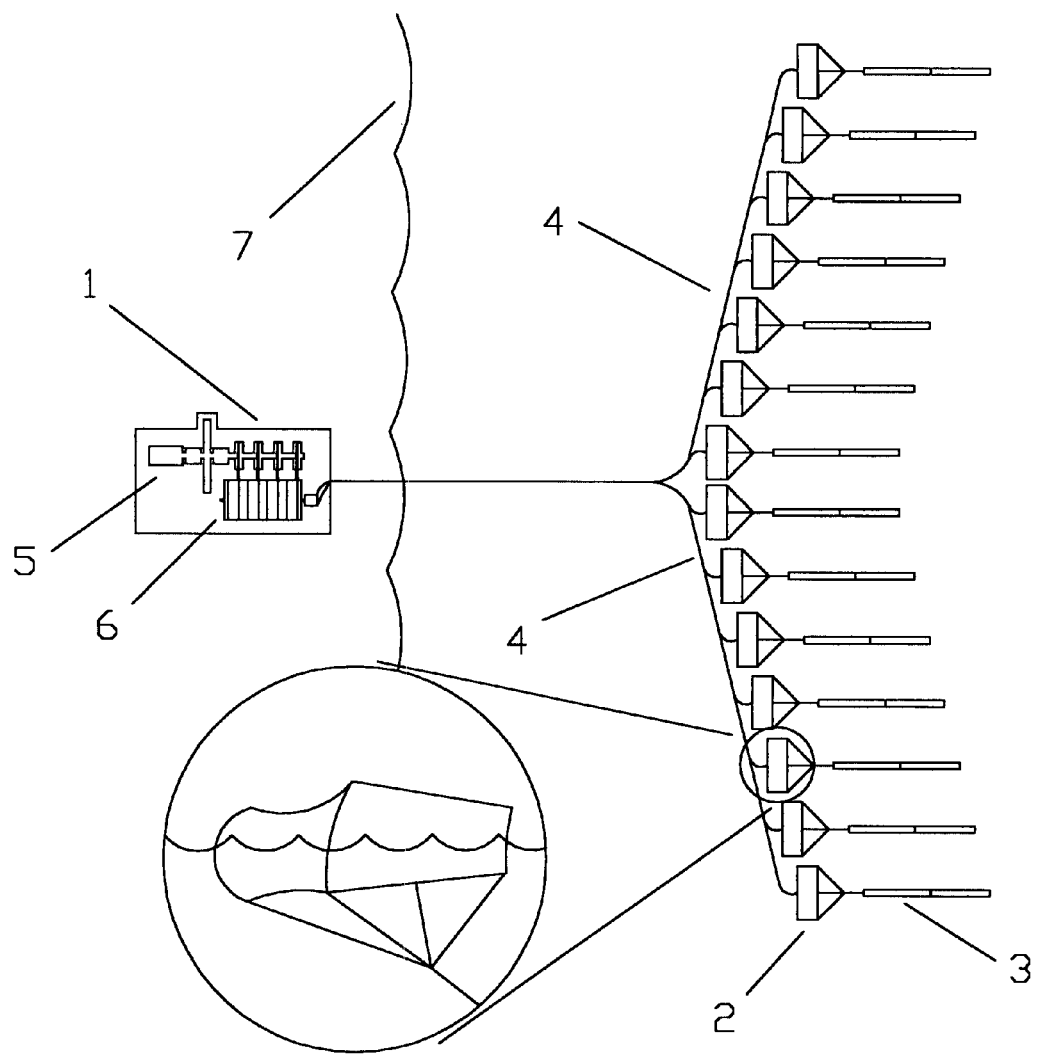

U.S. Provisional patent application No. 60/876,921. Filing date Dec. 22, 2006. Applicant Wayne Bishop, Orem, Utah. Title: Ocean wave electricity generator apparatus.

FEDERALLY SPONSORED RESEARCH

None

SEQUENCE LISTING

None

BACKGROUND OF INVENTION

This invention describes a method of capturing the energy contained in the vertical and horizontal motion of ocean waves and converting said energy into electricity for residential and commercial use.

ADVANTAGES OVER PRIOR ART

Numerous inventions have described methods for capturing wave energy. The primary problems with the prior art is achieving economic feasibility, providing consistent grid-ready electricity, and keeping the invention aesthetically, environmentally, and ecologically pleasing. Because waves in the ocean are a pulsing phenomenon, peaking rapidly and just as rapidly dropping, many inventions generate electricity in pulses. This requires complicated, expensive and inefficient inverters and electronic controllers to transform the energy into a useable form. Other inventions require placement miles out in the ocean. Expensive and dangerous electrically charged cables must be strung, and the generators can interrupt shipping and recreational areas. Some inventions must be applied in arrays of over vast amounts of ocean, which could cause large unsightly patches in the ocean, and can even disrupt or harm marine life.

OBJECTS AND ADVANTAGES

The Ocean wave electricity generator apparatus houses its components underground, and embedded in the ocean floor a few hundred feet from shore. The only components visible from land or ocean surface is the access door, and a small array of low profile buoys. Unlike some of the prior art, the generator will operate silently to those on the shore and water surface as well. Besides a few low-voltage sensors, no electronic components are placed in the ocean. Marine and ocean life can swim around and through the device without harm or injury, and the electricity generated by the system is a true-sine 60 hz grid-ready electricity. Once mass production is achieved, these generators will install quickly and easily, will be inexpensive to maintain, and will generate electricity inexpensively enough to compete with fossil fuel and nuclear generators.

Other embodiments of this invention would be that the constant energy output could be used to operate a water or fluid pump, run a piece of machinery, move objects from one place to another by way of a conveyor or other apparatus, or any other operation which requires a consistent rotational output.

SUMMARY

The Ocean wave electricity generator apparatus is an array of buoys placed a few hundred feet from shore, in the shallow ocean where the waves begin to break. Each buoy is tethered to a linear hydraulic pump that pumps hydraulic fluid to a main rotating drum each time a wave strikes the buoy. As the drum rotates, it lifts a number of weights contained in silos. As one of the weights arrives at the top of its silo, a mechanism releases the weight from the drum, allowing the weight to fall down the silo. The cable attached to the weight then rotates a series of transmissions and flywheels, which turn a generator at a constant and controlled speed, so as to produce grid-ready electric power identical to the electricity that coal or natural gas generators produce.

REFERENCE NUMERALS

1 Power station building
2 Buoy
3 Hydraulic pump assembly
4 Hydraulic lines
5 Drive axle and generator assembly
6 Cable spool and drum assembly
7 Shoreline
8 Cable spool
9 Hydraulic rotator pump
10 Hydraulic fluid reservoir
11 Support roller
12 Weight cable
13 Weight
14 Silo
15 Cable spool release clutch
16 Cable spool drum axle
17 Trigger mechanism
18 Drive axle and generator shaft
19 One-way ratcheting drive gear
20 Drive member
21 Continuously variable transmission
22 Flywheel
23 Constant velocity transmission
24 Generator
25 Electricity output to grid
26 Spring shocks
27 Tethering cables
28 Bellows
29 Hydraulic pump boom
30 Hydraulic pump boom input line
31 Hydraulic pump boom output line
32 Hydraulic pump boom ramrod
33 Slide track
34 Weighted slide
35 Slide track stops
36 Cable guide rollers.
37 Water surface waves
38 Ocean floor

DRAWINGS

FIG. 1 is a top view of the complete apparatus showing an array of buoys 2 located a pre-determined distance off shore 7 preferably at the location where waves begin to crest. The buoys 2 are connected to the hydraulic pump assembly 3 by any means of tethering device deemed appropriate. The pumping process of these buoys and pumps will be described later. Hydraulic lines 4 transfer the hydraulic fluid to the power station building 1 at a given location adjacent to the array of buoys—preferably on land, but possibly in the shallows of the ocean water. Here the fluid pressure is transformed into a consistent rotational energy by means of the cable spool drum assembly 6 and the drive axle and generator assembly 5, the details of which will be shown later.

Figure 2:
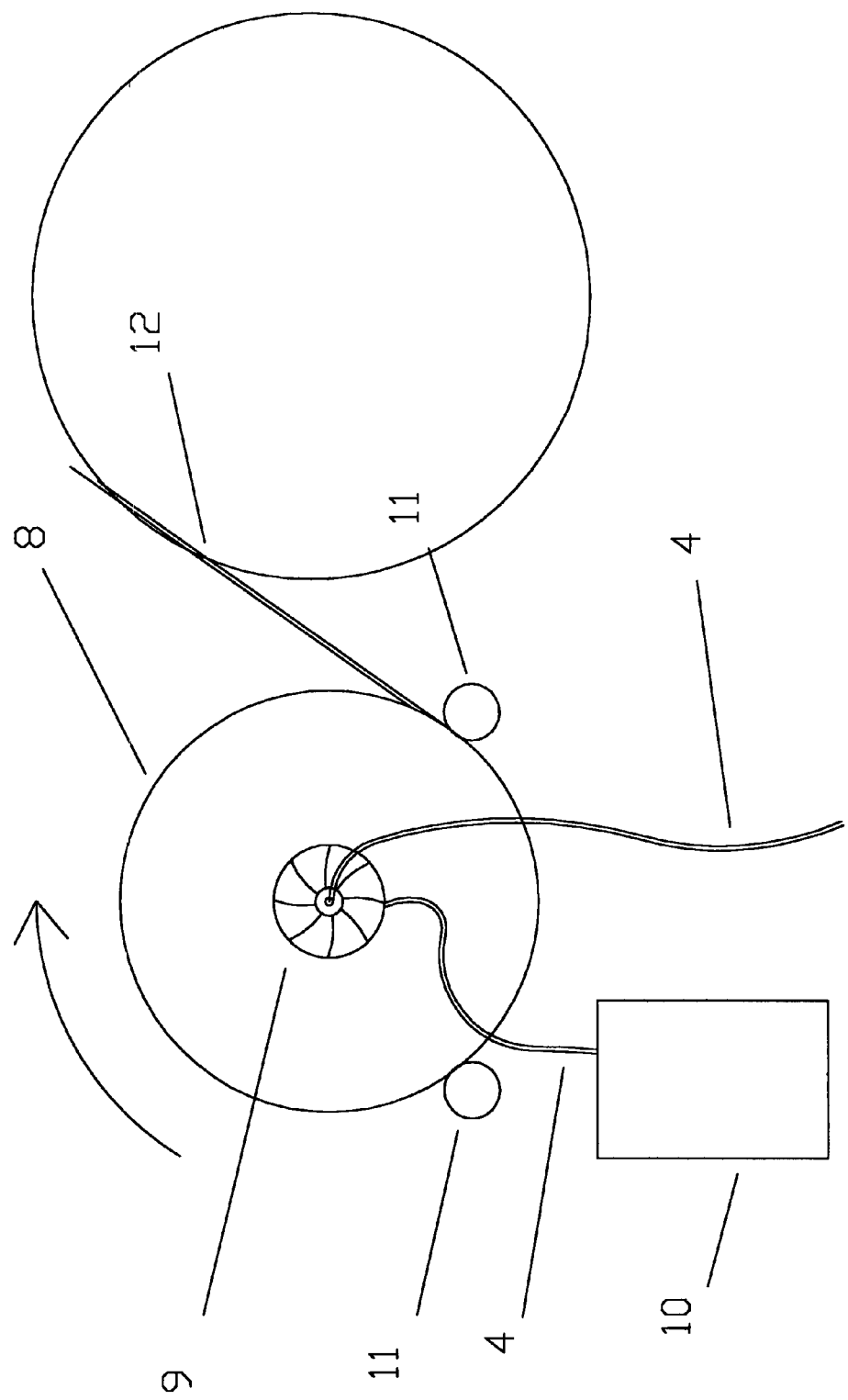

FIG. 2 is an end view of the cable spool drum assembly. The cable spool 8 is rotated as hydraulic fluid is pumped through the hydraulic lines 4 into a hydraulic rotator pump 9. Fluid is then pumped to a reservoir 10 for future use. The hydraulic rotator pump rotates the cable spool and drum so as to wind the weight cable 12 onto the spool. The drum assembly is supported by support rollers 11 to prevent drum from moving.

Figure 3:
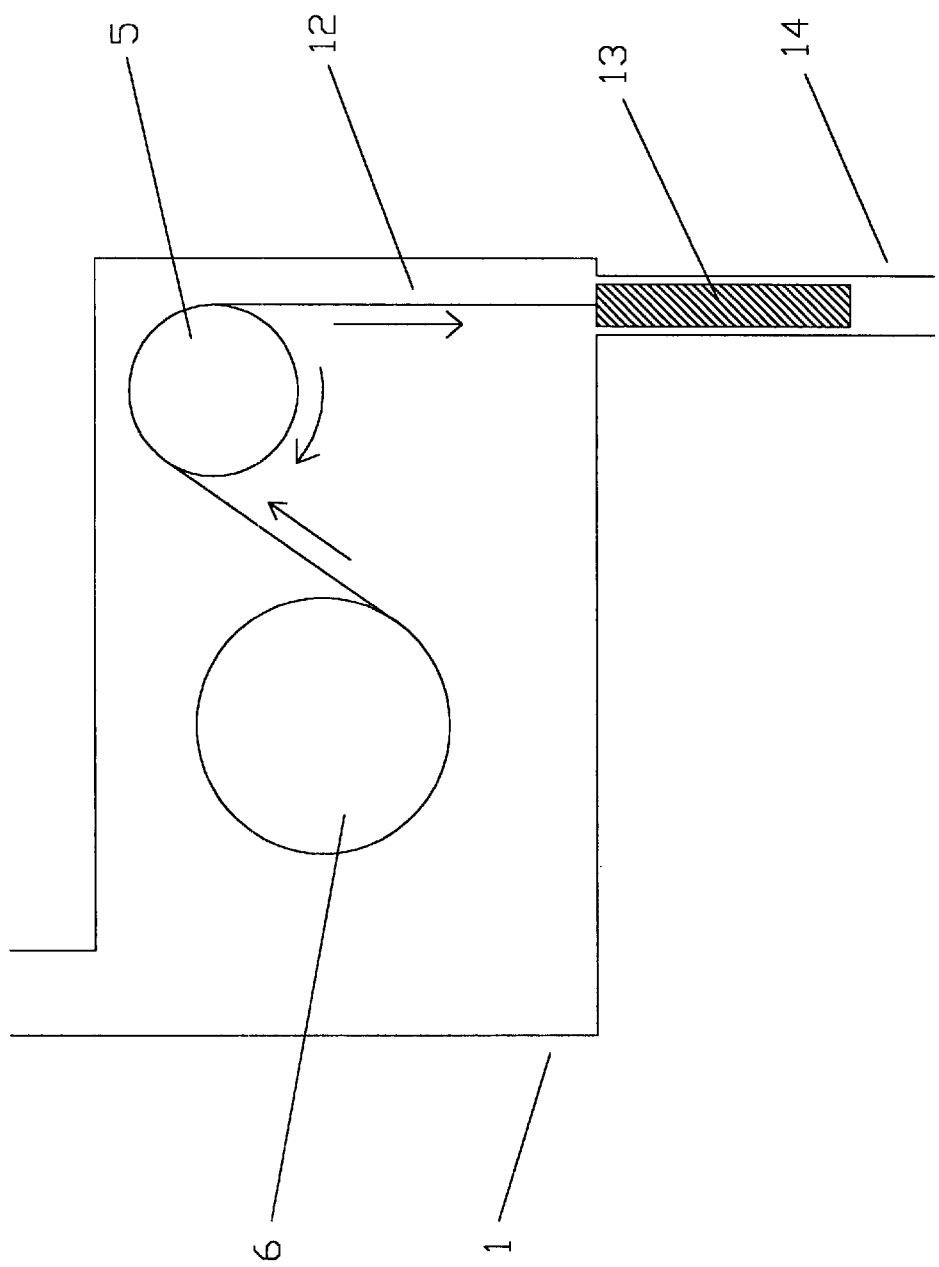

FIG. 3 is an end view of the cable spool drum assembly 6 and how it works with the drive axle and generator assembly 5. As the weight cable 5 winds around the cable spool, it is threaded around the drive axle and generator assembly. A weight of substantial mass 13 is attached to the end of the cable. As the cable winds up the weight is lifted up within a silo 14 created to house the weight.

Figure 4:
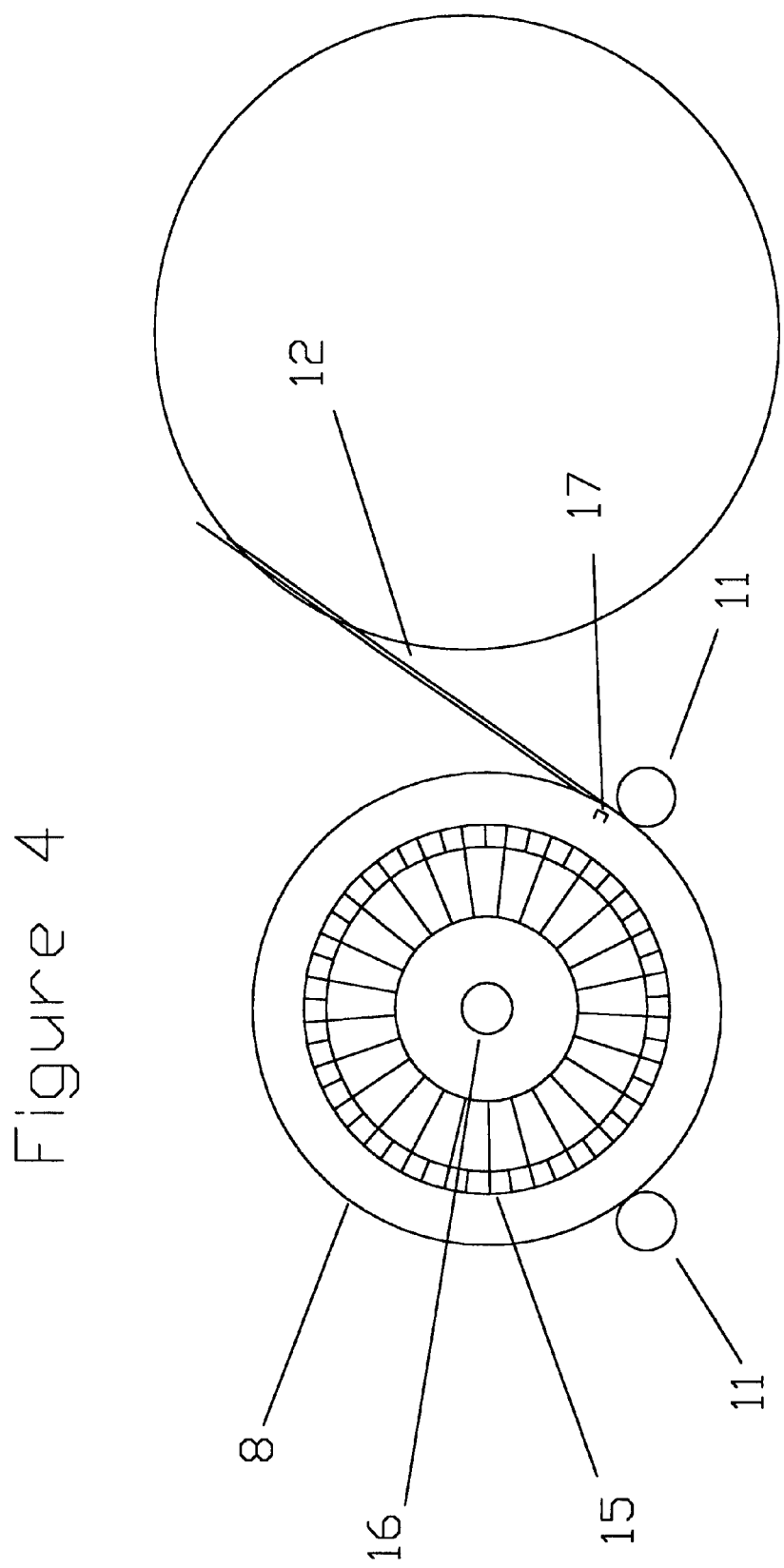

FIG. 4 shows the process by which the cable spool 8 releases from the cable spool axle 16 once the previously pictured weight reaches the top of the silo. Support rollers 11 support the weight of the cable spool drum. The cable spool release clutch 15 locks the cable spool to the cable spool drum axle 16. This allows the spool to wind as the previously pictured hydraulic rotator pump turns the axle. Once the weight reaches the top, trigger mechanism 17 releases the clutch 15 and causes the spool to disengage from the axle. This will allow the spool to free spin and the previously pictured weight will descend rapidly down the silo. Upon reaching the bottom of the silo, trigger mechanism 17 will re-lock the cable spool release clutch 15, and the cable will begin to wind again and the weight will be lifted in the silo.

Figure 5:
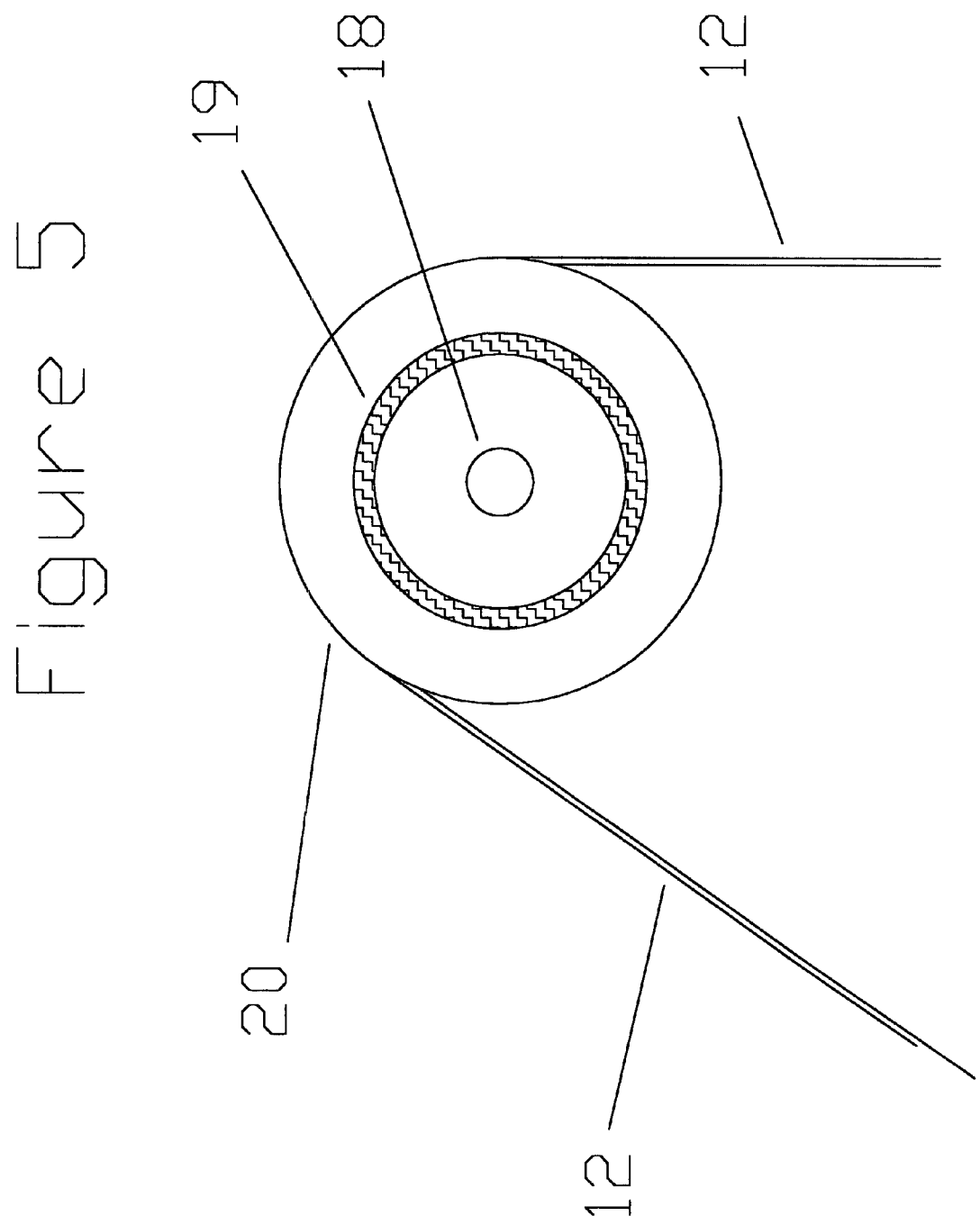

FIG. 5 shows the process by which the weight descending turns the drive axle and generator shaft 18. As the cable winds and the weight ascends up the silo, the one-way ratcheting drive gear 19 will not engage the axle and generator shaft. Therefore, the drive member 20 is turned by cable 12 as the cable winds, but the axle and generator shaft does not turn with it. Once the weight is allowed to descend by means described earlier, the one-way drive gear 19 engages the axle and generator shaft 18 causing them to rotate as one body.

Figure 6:
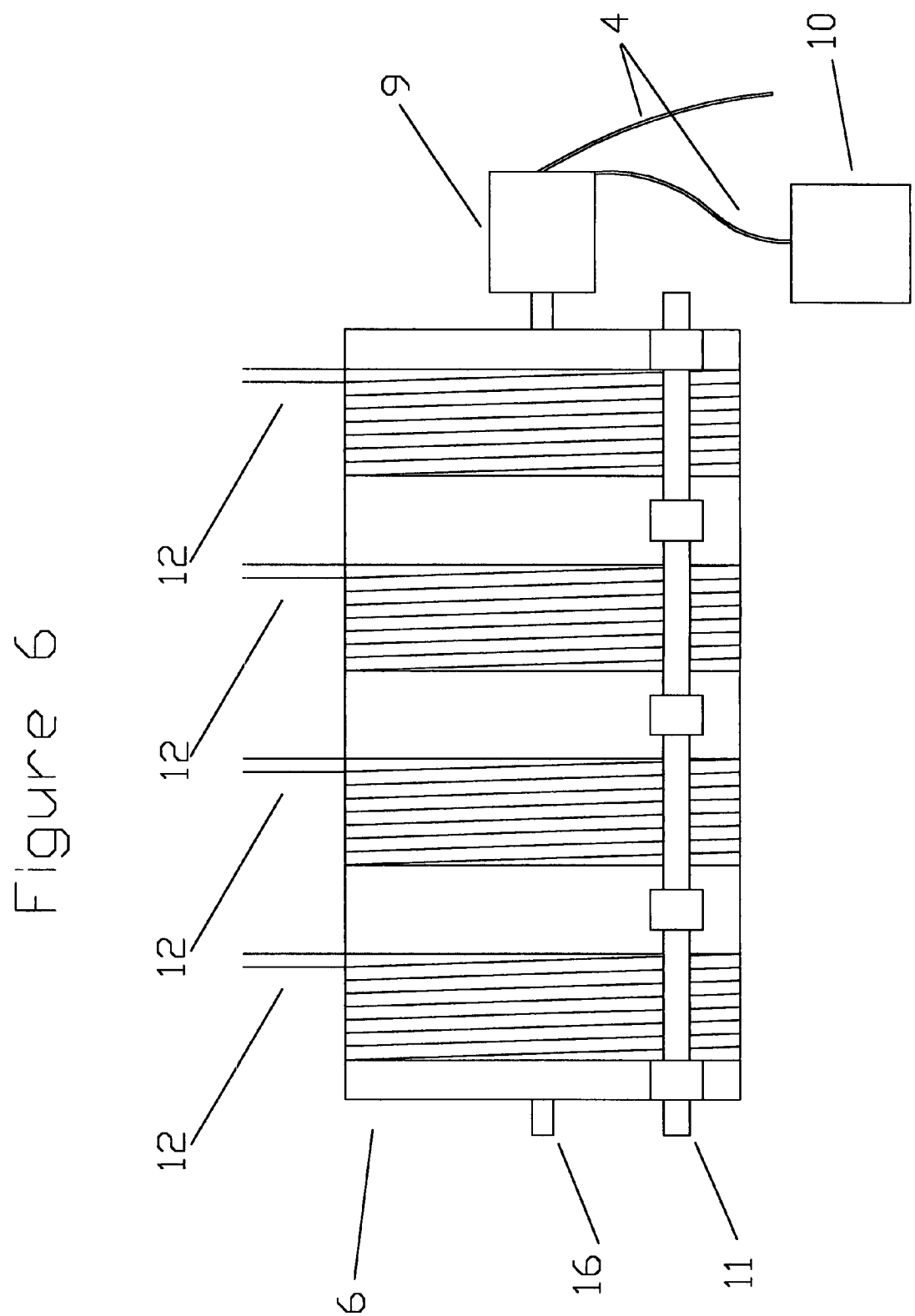

FIG. 6 is the side view of cable drum assembly 6. This shows the plurality of cables 12, which each attach to a separate weight not pictured. The support roller 11 supports the drum assembly 6. Pictured are 4 cable spools situated on cable spool drum axle 16. Also shown are hydraulic rotator pump 9, hydraulic line 4 and hydraulic reservoir 10.

Figure 7:
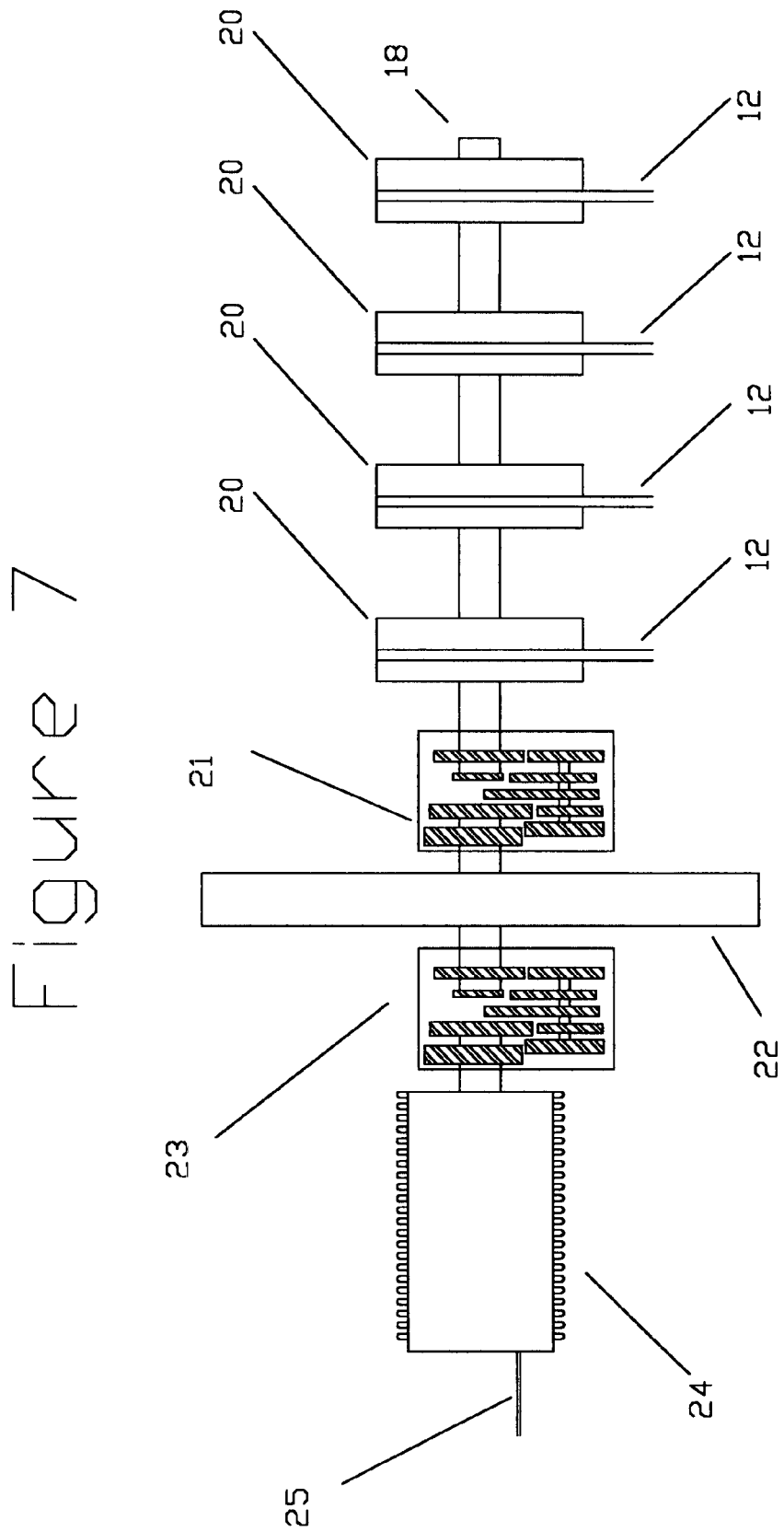

FIG. 7 is the side view of the drive axle and generator assembly showing the weight cables 12 wrapping around the drive members 20 resting on the drive axle and generator shaft 18. The shaft enters the continuously variable transmission 21. This transmission then rotates the flywheel 22 at a very rapid rate thus storing the kinetic energy. The flywheel then feeds a constant velocity transmission 23, which feeds the A\C generator 24 with a constant input speed allowing for 60 Hz A\C grid-ready power to be generated and delivered from power line 25.

Figure 8:
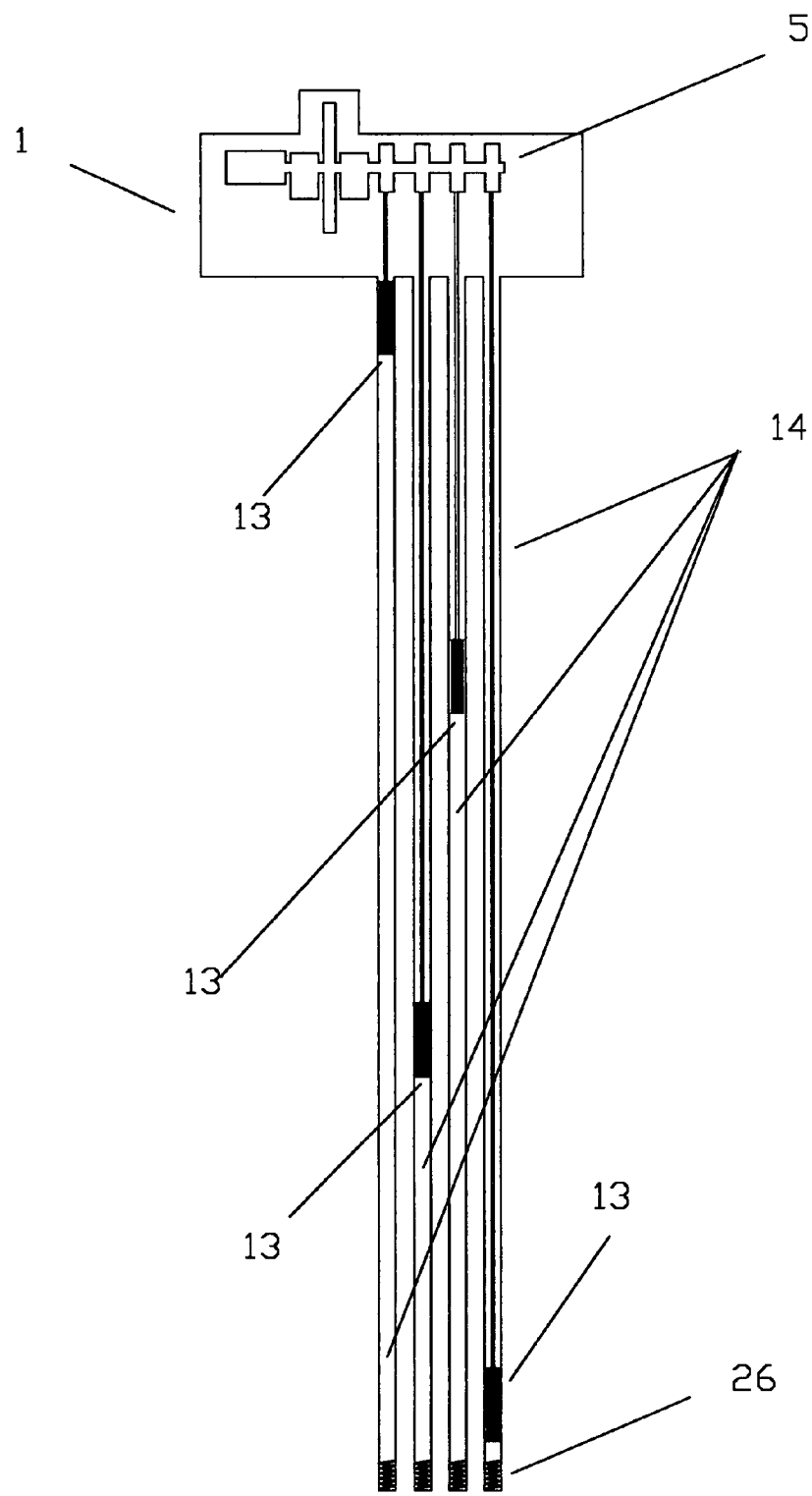

FIG. 8 is an elongated view of the silos 14 and the weights 13 and how they may be possibly distributed for the weights to arrive at the tops of their silos at different times. Each time a weight arrives at the top of a silo, it is released by above-mentioned means, and allowed to descend down the silo to turn the generator by above-mentioned means. Because of the nature of the continuously variable transmission pictured earlier, the weights will arrive at the bottom of the silos at a slow speed while the flywheel rotates rapidly. A spring shock 26 is placed at the bottom of each silo to soften the landing of each weight.

Figure 9:
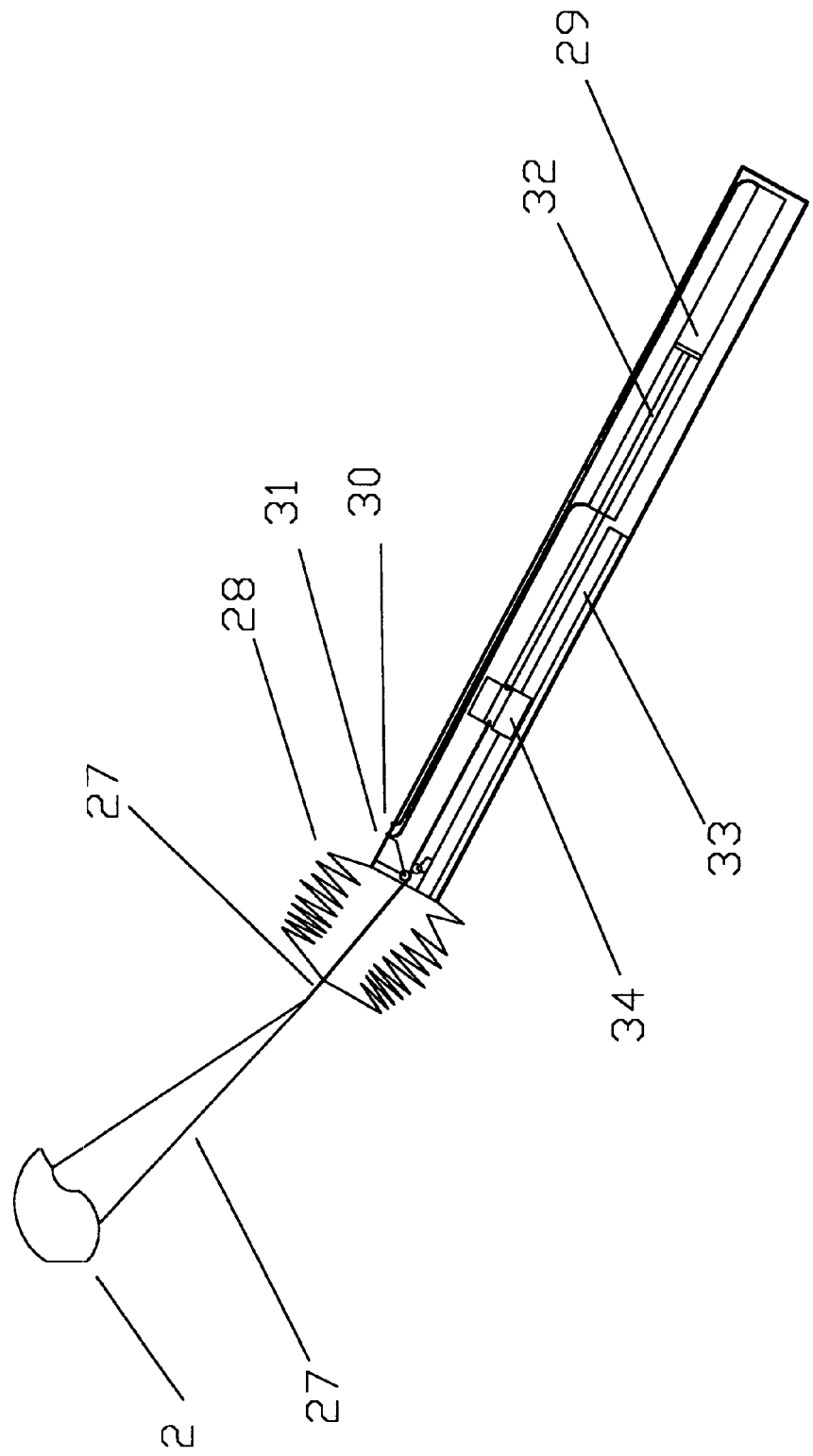

FIG. 9 is a detailed look at one of the buoys and hydraulic pump assemblies contained in the array. The buoy 2 is situated to float on the surface of the water. This is the only part of the generator visible from the surface of the water. It is designed such that maximum disturbance occurs each time an ocean wave strikes said buoy. Tethering cables 27 attach to the buoy and are fed through a waterproof bellows 28 and to a weighted slide 34, which slides up and down freely along a slide track 33. The other end of the slide track attached to the hydraulic pump boom ramrod 32. As an ocean wave strikes the buoy, the cables pull the weighted slide up the slide track, and pull the ramrod up the hydraulic pump boom 29 forcing hydraulic fluid out the hydraulic pump boom output line 31 and sucking hydraulic fluid into the hydraulic pump boom input line 30. Once the wave has passed, the weight on the weighted slide uses gravity to pull the buoy back to it's original resting position above the pump, and lowering the ram rod back to the bottom of the hydraulic pump boom. One way valves (not pictured) are placed in the hydraulic lines to prevent backward motion of the hydraulic fluid.

Figure 10:
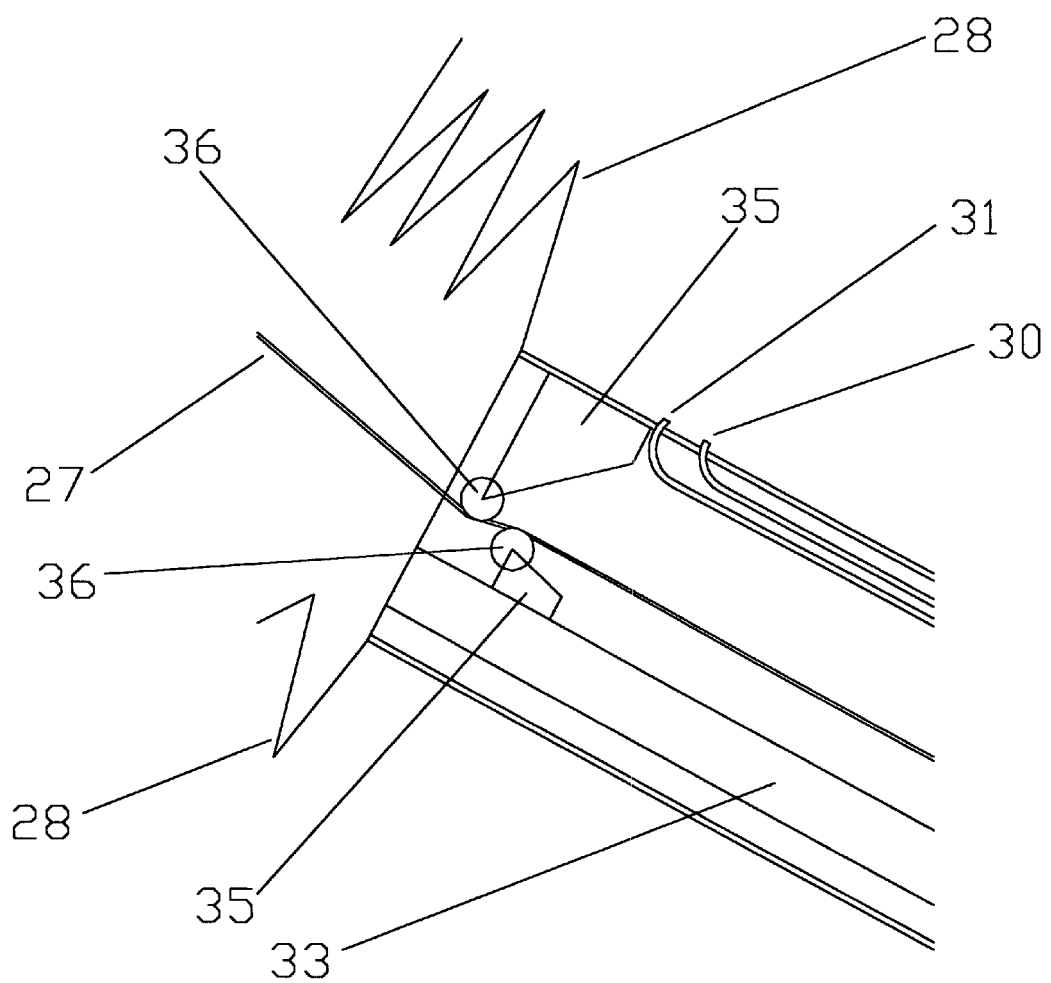

FIG. 10 shows the detail of the top of the hydraulic pump assembly. Tethering cables 27 enter the hydraulic pump boom assembly through the bellows 28 and threads between two cable guide rollers 36 before attaching to the weighted slide. The cable guide rollers are mounted on mounts which double as slide track stops 35. These stops prevent the weighted slide from sliding off the end of slide track 33 should the waves become excessively large.

Figure 11:
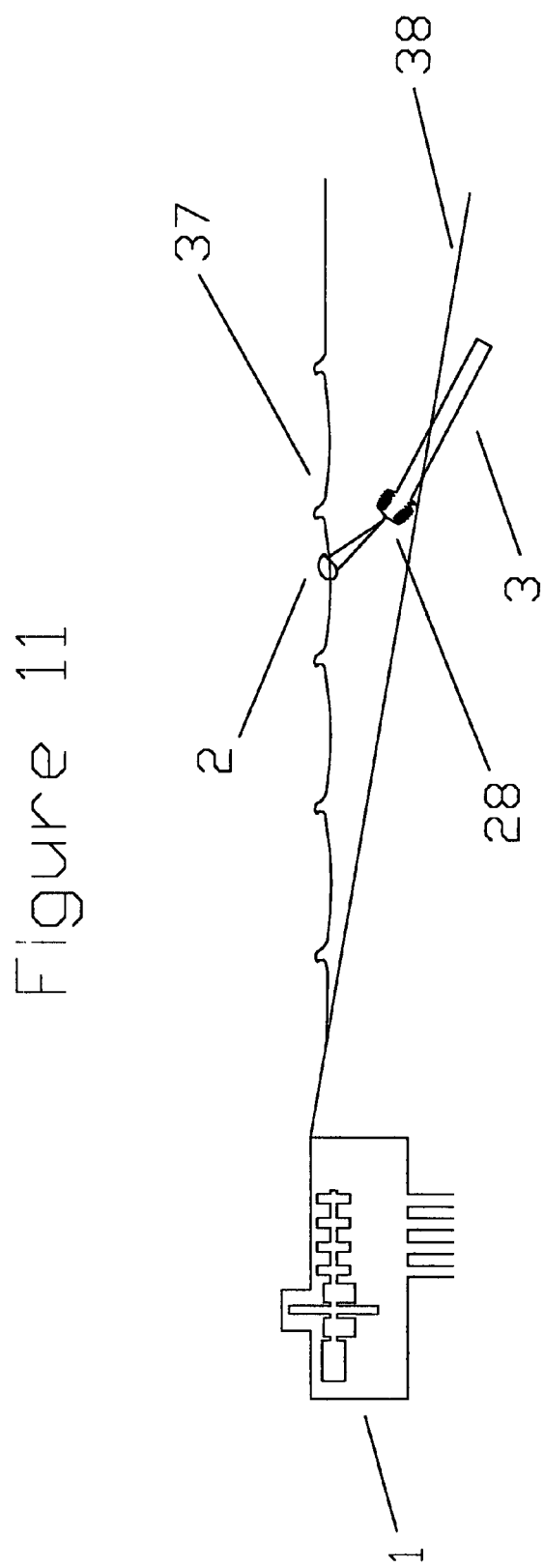

FIG. 11 shows how the hydraulic pump assembly 3 is mounted in the ocean floor 38 with respect to the ocean surface and waves 37 at low tide. At low tide the bellows 28 are mostly contracted and the weighted track operates on the lower half of the slide track previously pictured. The angle of placement of the hydraulic pump assembly in the ocean floor may differ from that which is pictured. It will be determined after proper engineering determines what works best.

Figure 12:
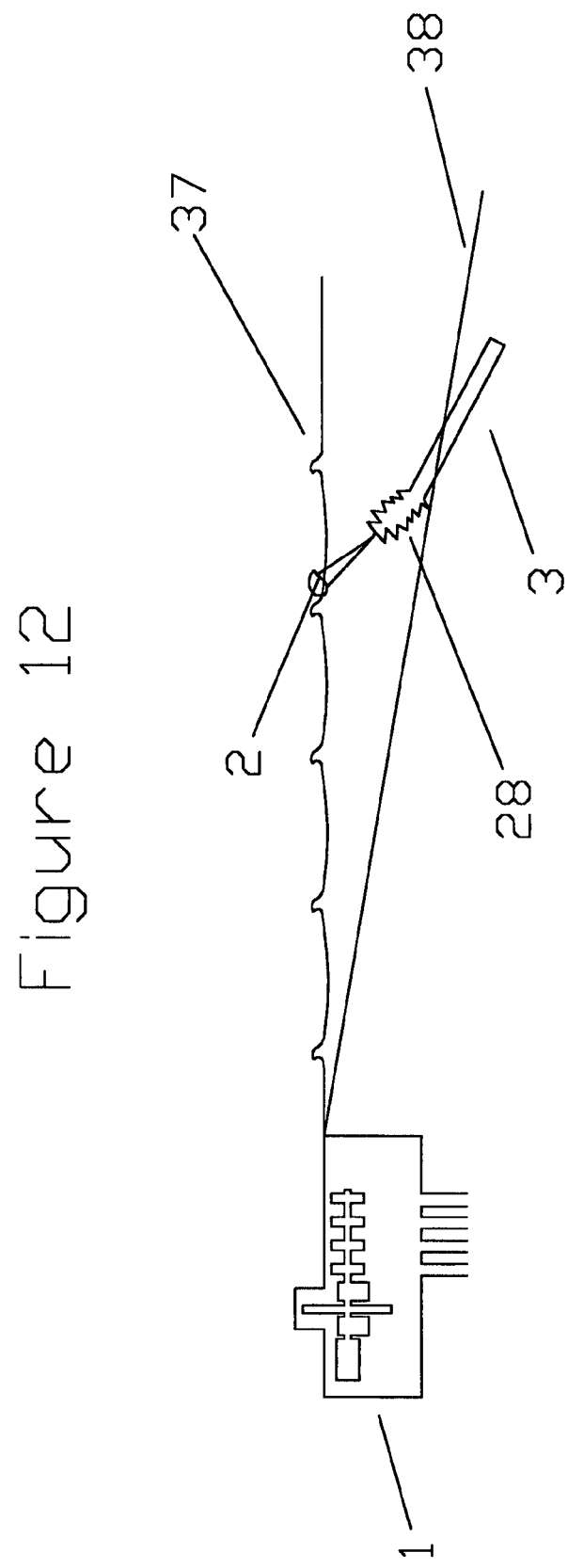

FIG. 12 shows how the hydraulic pump assembly 3 is mounted in the ocean floor 38 with respect to the ocean surface and waves 37 at high tide. At high tide the bellows 28 are mostly extended and the weighted track operates on the upper half of the slide track previously pictured.

DETAILED DESCRIPTION

My invention comprises an array of buoys positioned in the ocean just off the shoreline (FIG. 1). Best estimates would be 100 to 300 feet out, but testing could adjust this distance. The pontoon-style buoys 2 would be placed sideways and horizontally so that the waves would hit the broad sides of the buoys. The shape of the buoys would be designed to catch the top crest of the wave. The idea is that both the vertical and the horizontal components of ocean waves would cause movement in the buoy (circle inset, FIG. 1). Buoys would be approximately 10 to 15 feet long, 2 to 3 feet high, and 4 to 5 feet wide, depending on the need for stability. The number of buoys in the array would depend on need to operate the generator. 14 are shown, possibly 10 to 20 may be needed. This will depend on the average strength of the waves in the area, Each Buoy's determined size for optimal performance, and shape design of buoy for efficiently utilizing wave's energy. It is estimated that between 30 and 50 meters of wave would be needed to run a 1-megawatt generator using this design.

Each buoy would be tethered to a long linear hydraulic pump assembly secured in the ocean floor (FIGS. 9 and 10). This pump assembly includes a track 33 to which a slide 34 slides up and down as the buoy is displaced by waves. The weighted slide is used to pull the buoy back to its original position once the wave has passed. A waterproof bellows 28 made from an appropriately durable rubber composite is used to keep the seawater out of the assembly. To compensate for tides, the slide is extra long. During low tide, the slide moves along the lower part of the slide (FIG. 11). During high tide, the slide moves along the upper half of the slide (FIG. 12).

The lower half of the linear hydraulic pump assembly is a simple boom-style hydraulic pump (FIG. 9). As the weighted slide moves up the track it draws up the ramrod inside the pump. This forces hydraulic fluid out of a hydraulic line 31 and sucks in new fluid through hydraulic line 30. As the slide moves back down, the ramrod seal breaks and allows the new fluid to pass into the chamber to be pumped out with the next wave. Strategically placed one-way valves prevent fluid from flowing backwards. Hydraulic line 31 connects to a collection line 4 that brings all the fluid pumped in the array into one large line and delivers the fluid to the power station 1. It is estimated that each pump would deliver 500 to 800 lbs. of force in the lines. This will be converted to 7,000 to 10,000 lbs. once the fluid reaches the power station from all the pumps in the entire array.

In the power station, a large hydraulic rotator pump 9 is connected to a large drum (FIG. 2). This rotator pump is similar in design to the pumps used to rotate the heavy cement-filled drum on cement trucks. Connected to this drum are spools of cable. As the drum is slowly turned by the fluid coming from the buoy pumps, is winds up the cables 12 onto the spools 8 (FIGS. 2, 3 and 6).

The cables are attached to weights 13 which rise up and down in silos 14 dug in the earth (FIGS. 3 and 8). Each weight is estimated to be 1000 to 1500 lbs. but this may be changed as the engineering is done. 4 weights are pictured in the drawings, but any number may be used once optimal performance is determined. The weights are staggered in the silos so that as the spool is turned, the weights reach the top at different times (FIG. 8). Once a given weight reaches the top of a silo, a trigger mechanism 17 releases the spool from the rest of the drum and allows the weight to free-fall in the silo (FIGS. 3 and 4). Once the weight reaches the bottom of the silo. The trigger mechanism re-engages the spool to the drum and the weight will start to be lifted back up the silo. Each passing wave on the array would move the drum enough to lift all the weights 2 to 3 feet from their previous positions. Each silo is 150 to 200 feet deep, but this also may be changed as engineering dictates.

The cables are threaded around a drive member 20 on a drive axle and generator assembly (FIGS. 5 and 7). As the weight falls, the cable spins the drive axle and generator shaft 18. When weights are rising in the silos, a one-way ratcheting drive gear 19 allows the drive member 20 to free-spin (FIG. 5). This shaft feeds into a continuously variable transmission capable of a large gear ratio change 21. This part is where a lot of engineering and modifications may be needed. My thought is to have a company expert in large transmissions for heavy equipment design this part. We would likely need gear ratios ranging 1:1 to 1:15. The idea is that as the shaft spins faster, the gear ratio increases. The output shaft speeds up at a rate up to 15 times the speed of the input shaft. This slows down the weight as it descends in the silo. The weight actually reaches the bottom of the silo at a slow speed.

The output shaft is connected to a flywheel 22 of substantial weight and diameter which will be determined with engineering (FIG. 7). Once a weight reaches the bottom of its silo, the flywheel is spinning at an estimated 1000 to 1500 RPM due to the gear ratios of the continuously variable transmission. The flywheel could be up to 6 feet in radius and could weigh 5000 or more pounds. A flywheel of this size spinning this fast would store enough kinetic energy to run the generator between the weight drops.

The flywheel turns the input shaft of a constant velocity gear reducing transmission 23 also designed by a company expert at designing such things (FIG. 7). This transmission would be designed to turn the generator with a constant speed so long as the flywheel is spinning fast enough. If the constant velocity of the constant velocity transmission is 450 RPM, this would be sufficient to turn a 16 field 750 kw to 1 mw generator. The expectation would be that the flywheel would spin at 1500 RPM. This would be determined by a point of equilibrium between the weight falling, the gears in the continuously variable transmission, and the size of the flywheel. The constant velocity transmission would then hold a 3.33 to 1 ratio to spin the output shaft. The flywheel turns the generator with one-third the effort necessary. As the flywheel slows down, the gear ratio increases in the constant velocity transmission. This continues until the flywheel slows down to 450 RPM. At this point, the constant velocity transmission holds a 1:1 ratio. If the flywheel slows down to below 450 RPM, a clutch will release the generator and the flywheel will free spin. The apparatus will be designed to have another weight fall and speed up the flywheel before this happens under usual conditions.

What is claimed is:

1. An apparatus for generating power using energy from fluid wave action comprising:
    a plurality of floatation buoys each attached by a tether line to a hydraulic pump assembly, each buoy configured to float near the surface of a body of fluid, and to be so designed as to move significantly when acted upon by motion in said body of fluid;
    each hydraulic pump assembly being anchored to the solid floor beneath said body of fluid and having:
        at least one guide roller for the tether line connecting the buoy to the hydraulic pump assembly;
        a sealed, generally cylindrical outer housing;
        a hydraulic pump assembly containing an inner piston and ramrod assembly, having the piston slidably mounted within, and a counterweight connected to said piston, the piston thus configured to respond to the described motion of the associated buoy by moving in an upward direction within the cylindrical housing when pulled by the tether line and moving in a downward direction when acted upon by the counterweight;
        the inner piston and ramrod assembly, combined with the counterweight forming a hydraulic pump boom, which moves a hydraulic fluid in a closed hydraulic fluid loop along an output hydraulic line from the cylindrical housing to a hydraulic rotator pump, and receiving hydraulic fluid from a hydraulic fluid reservoir along an input hydraulic line;
        a bellows that keeps the body of fluid and any near-by debris outside of the cylindrical housing and permits passage of the tether line into the cylindrical housing while allowing movement of the buoy in response to motion in the body of fluid; and
        a slide track for guiding movement of the counterweight;
    a drive axle and generator assembly comprising:
        the hydraulic fluid reservoir for supplying hydraulic fluid to the closed hydraulic loop;

the hydraulic rotator pump which receives the hydraulic fluid under pressure from the hydraulic pump assemblies and uses the hydraulic fluid to rotate a plurality of cable spools having cables attached thereto;

a plurality of weights, one associated with each cable spool, each weight connected to the end of its associated cable and housed in an associated silo, the weights designed to rise as the cable spools rotate under the influence of the rotator pump and designed to disengage from the influence of the rotator pump and free fall upon reaching a predetermined position, the falling of said weights thus turning an input shaft of a continuously variable transmission; and upon reaching the lowest point in its free fall, said weights re-engaging with the influence of the rotator pump;

a flywheel connected to an output shaft on the continuously variable transmission for temporarily storing kinetic rotational energy derived from the falling weights;

a constant velocity transmission attached to the flywheel for providing a constant rotational motion from which any acceptable process or provision may be supplied with power.

2. The apparatus of claim 1 further comprising a generator connected to the constant velocity transmission for generating electricity.

3. The apparatus of claim 1 further comprising a fluid pumping apparatus connected to the constant velocity transmission for pumping water, petroleum or another fluid.

4. The apparatus of claim 1 further comprising an attachment collar and shaft connected to the constant velocity transmission to allow the apparatus to provide power to a mechanism requiring a constant rotational input.

5. The apparatus of claim 1 wherein the cables attached to the plurality of cable spools are formed of a predetermined shape and from a predetermined material.

6. The apparatus of claim 1 wherein the drive axle and generator assembly are housed in a protective structure.

* * * * *